AUTOMATIC BRIGHTNESS-CONTRAST CONTROL USING PHOTORESISTIVE ELEMENT TO CONTROL BRIGHTNESS AND AGC VOLTAGES IN RESPONSE TO AMBIENT LIGHT

Filed April 24, 1961

INVENTOR:
VAN R. GIBSON, JR.
BY Joseph Levinson
HIS ATTORNEY.

3,147,341

AUTOMATIC BRIGHTNESS-CONTRAST CONTROL USING PHOTORESISTIVE ELEMENT TO CONTROL BRIGHTNESS AND AGC VOLTAGES IN RESPONSE TO AMBIENT LIGHT

Van R. Gibson, Jr., North Syracuse, N.Y., assignor to General Electric Company, a corporation of New York Filed Apr. 24, 1961, Ser. No. 104,909
20 Claims. (Cl. 178—7.5)

Figures 1, 2:
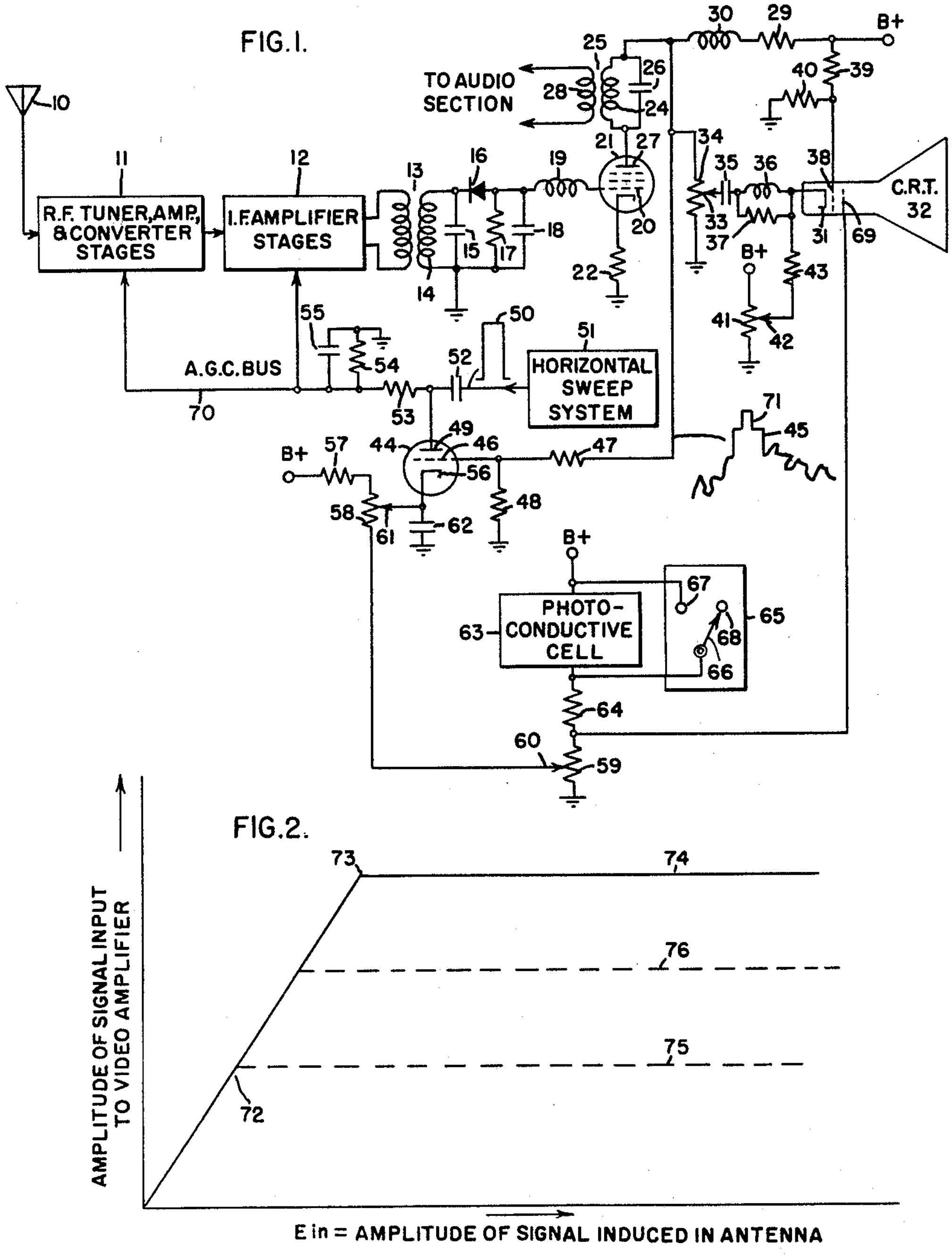

This invention relates to a means for automatically controlling the contrast and brightness characteristics of a television receiver and more specifically to a means for automatically controlling these characteristics with relation to the intensity of the light which strikes the face of the picture tube of the television receiver.

Viewing comfort is considerably increased if a party viewing a television receiver is relieved of the task of re-adjusting the receiver brightness and contrast levels in order to maintain an attractive picture when changes in the intensity of the light striking the face of the picture tube occur. Such changes may occur for example with a change in the ambient illumination or when a light source directs a large amount of light toward the face of the picture tube without significantly altering the level of the ambient illumination. After establishing desired levels of contrast and brightness for an initial light level, it is desirable to increase the contrast and brightness levels with an increase in the light level and decrease the contrast and brightness levels with a decrease in the light level.

A method known in the art for automatically performing these desired changes in brightness and contrast levels utilizes an element which is exposed to the light striking the face of the picture tube and having an electrical characteristic which varies with changes in the intensity of the light striking the element. This change in the electrical characteristic of the element is then utilized to automatically control the brightness and contrast levels of the television receiver in the aforementioned desired manner.

An element which is utilized for such control purposes is the cadmium-sulfide photo-conductive cell, which is also known in the art as a "light dependent resistor." This element exhibits an electrical conductivity which increases in proportion to an increase in the intensity of the light striking it.

Certain television receivers have utilized this photo-conductive cell for automatically and simultaneously varying the contrast and brightness levels of the receiver in the desired manner by connecting the photo-conductive cell in the video amplifier circuit. The photo-conductive cell when so utilized has been connected in a manner so as to either vary an operating characteristic of the amplifying device in the video amplifier circuit, resulting in a variation in the gain of the video amplifier and therefore the contrast of the receiver, or to create a variable voltage divider action in the circuit coupling the video amplifier output signal to the picture tube control circuit, thereby varying the contrast. Brightness has been simultaneously varied with contrast by connecting a control electrode of the picture tube to a point in the video amplifier circuit having a D.C. potential which is responsive to variations in the resistance of the photo-conductive cell.

Coupling a photo-conductive cell in the video amplifier circuit has certain disadvantages. When an operating characteristic of the amplifying device is varied with changes in light level and the receiver includes an automatic gain control system of the type which derives a signal for control purposes from the output circuit of the video amplifier, a false indication of the level of the received signal will be transmitted to the AGC system and a correction signal must therefore be provided. This, of course, requires additional circuitry.

Furthermore, since the photo-conductive cell must be mounted in a manner so as to be exposed to the light falling on the face of the picture tube, lengthy leads will generally be necessary for connecting the photo-conductive cell to the video amplifier circuit. These leads will add undesirable capacitance to ground in the video amplifier circuit which is a critical circuit in the receiver, and can introduce, through inductive or capacitive coupling, undesirable "noise" into the video signal.

It is therefore an object of this invention to provide an improved system of automatic contrast and brightness control for a television receiver which is responsive to changes in the intensity of the light striking the face of the picture tube and which is not subject to the aforementioned disadvantages.

It is also an object of this invention to provide a system of automatic contrast control which provides a greater change in the contrast level of a television receiver in response to a given change in the intensity of the light striking the face of the picture tube than has heretofore been possible.

It is also an object of this invention to provide a system of automatic contrast and brightness control which is responsive to changes in the intensity of the light striking the picture tube and which utilizes a minimum number of electrical components.

In accordance with this invention, in a television receiver having a picture tube and an automatic gain control circuit, an element having an electrical characteristic which varies with the intensity of the light striking it is provided and positioned in a manner so as to be struck by light of substantially the same intensity which strikes the face of the picture tube. The element is coupled to the automatic gain control circuit of the receiver in a manner so as to enable the automatic gain control circuit to automatically vary the gain and therefore the contrast of the receiver responsive to the intensity of the light striking the element. Simultaneous and automatic brightness control for the receiver is provided by coupling an electrode of the picture tube to a point in the circuit including the light sensitive element having a D.C. potential which varies responsive to the intensity of the light striking the element.

A preferred arrangement would provide a photo-conductive cell coupled to a keying tube in a keyed automatic gain control circuit for varying the gain and therefore the contrast of the receiver responsive to variation in the intensity of the light striking the cell. An electrode of the picture tube is coupled to the photo-conductive cell circuit in a manner so that the potential on the electrode varies with variations in the intensity of the light striking the cell.

Further objects, features and attending advantages of this invention will be apparent with reference to the following specifications and drawings in which:

FIGURE 1 is a diagram, partly schematic and partly in block form, of an automatic brightness and contrast control circuit and associated circuitry for a television receiver, and FIGURE 2 is a diagram illustrating an automatic gain control characteristic of a television receiver.

Referring now to FIGURE 1, a television signal voltage developed in antenna 10 is coupled to radio frequency tuner, amplifier and converter stages 11 where it is amplified and converted to an intermediate frequency signal which is amplified in IF amplifier stages 12. An IF transformer 13 couples the amplified IF signal to the video detector circuit via its secondary winding 14 which is tuned to the IF frequency by a capacitor 15. The signal is rectified by diode 16 so as to produce a composite video signal across a load resistor 17. Capacitor 18 by-passes IF frequencies to ground and a peaking coil 19 couples the video signal to the control electrode 20 of the video frequency amplifying pentode tube 21. Bias for tube 21 is provided by the D.C. component of the rectified signal. A protective bias is provided for tube 21 by the self biasing resistor 22. A tuned circuit comprising the primary winding 24 of transformer 25 and capacitor 26 is connected to the anode 27 of tube 21. This circuit is tuned to the intercarrier frequency of 4.5 megacycles. The secondary winding 28 of transformer 25 couples this 4.5 megacycle signal to the audio section, not shown, in the receiver. Operating potential is supplied to anode 27 of tube 21 via load resistor 29, peaking coil 30, and the primary winding 24 of transformer 25. The video signal appears amplified at the anode 27 of video amplifier tube 21 and is coupled to cathode 31 which is a video signal input electrode of the cathode ray picture tube 32 through the sliding contact 33 of the manual contrast control potentiometer 34, coupling capacitor 35 and peaking coil 36. The peaking coil 36 is shunted by a damping resistor 37. The control electrode 38 is maintained at a desired fixed potential by the voltage divider comprising resistors 39 and 40 which are serially interconnected between B+ and ground potential. A manual brightness control potentiometer 41 is connected between B+ and ground potential and provides a selectable bias voltage for cathode 31 of picture tube 32 via sliding arm 42 and current limiting resistor 43. The video signal appearing at the cathode 31 of picture tube 32 will cause an image reproducing electron beam therein to be modulated in accordance with the video information contained in the video signal.

A keyed automatic gain control circuit is provided including a keying triode tube 44. The amplified composite video signal 45, including a synchronizing pulse 71, is coupled to the control electrode 46 via the resistive attenuating network comprising resistors 47 and 48. This voltage divider also attenuates and connects the D.C. voltage at anode 27 of tube 21 to control electrode 46 of tube 44. Plate voltage is supplied periodically to anode 49 of tube 44 by a pulse 50 which is derived from a horizontal output transformer, not shown, in the horizontal sweep section 51 of the receiver. The pulse 50 is coupled to anode 49 by a capacitor 52. An AGC voltage, which will hereinafter be described in more detail, is developed at the junction of capacitor 52 and anode 49 and is coupled for gain control purposes to the RF tuner, and IF amplifier stages 12 of the receiver via filter resistors 53 and 54 and filter capacitor 55 and the AGC bus 70. A bias voltage for the cathode 56 of triode 44 is provided by the serial connection of a resistor 57, which is connected to B+, an AGC control potentiometer 58 and that portion of a potentiometer 59 between a sliding arm 60 and ground potential. The cathode voltage may be varied by adjusting an arm 61 of potentiometer 58. The cathode is by-passed for video and audio frequencies to ground by a capacitor 62.

The following discussion relates to a portion of the receiver embodying this invention. A photo-conductive cell 63 is serially connected with a resistor 64 and potentiometer 59 between B+ and ground potential. This cell may be of the cadmium-sulfide type which is of the photo-conductive variety and which exhibits a decreasing resistance with an increase in the intensity of the light striking it. The cell 63 is positioned on or about the receiver in a manner so as to be exposed to light of substantially the same intensity as that which strikes the face of the picture tube. A disabling switch 65 having a movable contact arm 66 and stationary terminals 67 and 68 is provided and shunts the cell 63. When the contact arm 66 and terminal 67 make contact, the cell 63 will be shorted out and therefore have no effect on receiver operation. A voltage which exists at the junction of resistor 64 and potentiometer 59 is connected to and utilized as an operating potential for a grid 69 of the cathode ray tube 32. Grid 69 is an electrode in the picture tube 32 which exhibits a brightness control characteristic. FIGURE 1 illustrates grid 69 as being the conventional first anode which exhibits a brightness characteristic having increased brightness with increasing positive potential.

Keyed automatic gain control circuits are well known but for a better understanding of the specific embodiment of this invention shown in FIGURE 1, the keyed automatic gain control circuit illustrated therein will now be described. For the purpose of this description, the contact arm 66 and terminal 67 of disabling switch 65 will be in contact thereby rendering the action of the photoconductive cell 63 ineffective on the operation of the receiver. In an automatic gain control system for a television receiver the amplitude of the synchronizing pulse of the composite video signal is sampled in order to provide an accurate indication of the intensity of the received signal. In a keyed automatic gain control system a pulse coincident in time with the synchronizing pulse of the composite video signal is provided in order to limit sampling to that period of time when the synchronizing pulse occurs. In FIGURE 1, the keying tube 44 is provided with a pulse 50, coincident in time with the synchronizing pulse 71 of the composite video signal 45. The pulse 50 provides anode potential for anode 49 so that tube 44 will become conductive only during the occurence of pulse 50. Furthermore, the bias voltage between control electrode 46 and cathode 56 is selected so that the tube 44 will be in a state of plate current cut-off for all portions of the composite video signal 45 applied to control electrode 46 except the more positive portions of synchronizing pulse 71. This bias is established by the voltage provided at the cathode 56 by the voltage divider comprising resistor 57, potentiometer 58, and that portion of potentiometer 59 between arm 60 and ground potential and by the D.C. voltage provided at the control electrode 46 by the resistive voltage divider comprising resistors 47 and 48. Upon the coincidence of pulse 50 at anode 49 and synchronizing pulse 71 at control electrode 46, plate current will flow. The amount of plate current which flows will be dependent upon the extent to which the synchronizing pulse 71 drives the tube 44 out of cut-off. This in turn is proportional to the amplitude of the synchronizing pulse 71 which, as has been stated, is proportional to the intensity of the received signal. Due to this plate current flow a negative control voltage proportional to the intensity of the received television signal will appear in the plate circuit of tube 44 and on the AGC bus 70. This AGC voltage is utilized to control the gain of stages 11 and 12 in order to maintain the amplitude of the video signal at the output of the video detector, at the control electrode 20 of video amplifier tube 21, and ultimately at an input electrode of the picture tube at a selected constant level. This level is the contrast level. Stated otherwise, the AGC circuit operates as a video signal voltage regulator for maintaining the contrast level at its established level.

With regard to the selection of this contrast level and more particularly to the subject of the invention and referring now to FIGURE 2, an idealized automatic gain control characteristic for a television receiver is illustrated by the solid line curve. A portion, 72, of this curve indicates that the input signal to the receiver is amplified uniformly to a point 73 on the curve. At this amplitude of input signal, the AGC circuit becomes operative and maintains the signal input to the video amplifier grid 20 and ultimately at an input electrode of the picture tube at a substantially constant value of contrast level represented by portion 74 of the curve. The portion, 72, of the curve illustrates what is known as delayed operation of the AGC circuit. The delay is not a delay in the sense that a certain time must elapse before the AGC circuit becomes operative but rather, the delay represents a suppression of the AGC circuit operation unless the signal induced in the antenna has a minimum amplitude. The projection of point 73 on the abscissa of FIGURE 2 will indicate the minimum signal amplitude which must be induced in the antenna before the AGC circuit will become operative. The delay insures that the maximum gain of the receiver is fully utilized at the lower input signal amplitudes. The curve of FIGURE 2 further illustrates that by varying the delay of the AGC circuit, the contrast level at an input electrode of the video amplifier will simultaneously be varied. For example, by decreasing the amount of delay, the maximum amplitude of the signal input to the video amplifier will be decreased as indicated by curve 75 which represents a regulated contrast level and by increasing the amount of delay from the value at 75, the maximum amplitude of the signal at the video amplifier is increased as indicated by curve 76 which also represents a distinct regulated contrast level.

The amount of delay and corresponding operation at different contrast levels of FIGURE 2 may be controlled by controlling the bias on the keying tube 44 of FIGURE 1. For example, if arm 61 of potentiometer 58 is varied in a manner so as to make cathode 56 more positive, the plate current flow upon coincidence of pulses 50 and 71 will be reduced from its prior value resulting in a less negative voltage on the AGC bus and an increase in the gain of stages 11 and 12. Although the positive potential at electrode 46 will increase along with the amplitude of the synchronizing pulse 71 due to the increase in potential at cathode 56, an increment in bias voltage between control electrode 46 and cathode 56 from its initial value will exist thereby maintaining the flow of plate current at its reduced value.

In accordance with this invention, an element having an electrical characteristic which is proportional to the intensity of light striking it is coupled to the AGC circuit in a television receiver in a manner so as to control the contrast of the receiver. The element is coupled to an electrode in the picture tube in a manner so as to simultaneously control the brightness of the receiver. Referring to the specific embodiment of FIGURE 1 and, in accordance with this invention, the potential at the cathode 56 of tube 44 is varied in response to the intensity of the light striking the face of the picture tube so as to vary the bias voltage on keying tube 44 and therefore the contrast of the receiver while the brightness is simultaneously varied. When contact arm 66 and terminal 68 of switch 65 make contact, the photo-conductive cell 63 is actively connected in series with resistor 64 and potentiometer 59 between B+ and ground potential. The current flowing in this series circuit will be inversely proportional to the resistance of the cell 63. When the light striking the cell 63 is of high intensity, the resistance of cell 63 will be relatively low in value. Therefore a relatively high current will flow in the circuit and the potential at arm 60 of potentiometer 59 will be at a relatively high potential, the voltage at cathode 56 of keying tube 44 will be at a relatively high value and a relatively large bias will exist between control electrode 46 and cathode 56. As has heretofore been explained, this will result in a high contrast level for the receiver. Furthermore, the voltage at the junction of resistor 64 and potentiometer 59 will be at a relatively high level resulting in a high voltage at grid 69 of picture tube 32. This will result in a relatively high brightness level for the receiver. Conversely, when the light striking cell 63 is of low intensity, the resistance of cell 63 will be high in value and a relatively small current will flow in the circuit. Therefore the potential at arm 60 will decrease as will the potential at grid 69 resulting in simultaneously decreased contrast and brightness levels. Since the photo-conductive cell 63 is exposed to light of substantially the same intensity as that striking the picture tube 32, it can thus be seen how the contrast and brightness levels have been made to simultaneously and automatically increase with an increase in the intensity of the light striking the face of the picture tube and decrease with a decrease in the intensity of the light striking the face of the picture tube.

The initial levels of brightness and contrast at the picture tube in the receiver may be adjusted by the potentiometers 41 and 34 respectively. Since it is desirable that the contrast and brightness in the receiver change in a fixed ratio, potentiometer 59 may be utilized for selecting this ratio. The potentiometer 58 is utilized in order to initially adjust operation of the keyed automatic gain control system for operating conditions in a manner well known in the art.

It can readily be seen that the change in voltage at the cathode 56 of keying tube 44 resulting from a change in resistance of photo-conductive cell 63 appears amplified in the system and thus provides the described system with a sensitive contrast control responsive to changes in light intensity yet requires no additional amplifying elements.

Although the present invention has been described as utilizing a keyed automatic gain control means, it is equally applicable for use with other types of automatic gain control circuits.

While I have illustrated and described and pointed out in the annexed claims certain novel features of my invention, it will be understood that various omissions, substitutions, and changes in the forms and details of the system illustrated may be made by those skilled in the art without departing from the spirit of the invention and scope of the claims.

What I claim is:

1. An automatic contrast control circuit for a television receiver having a picture tube including a viewing face which is struck by light from a source external to said picture tube comprising: a keyed automatic gain control circuit having an electron discharge device including a cathode and control electrode, means for establishing a bias voltage between said cathode and control electrode, a voltage divider including a photo-conductive cell and at least one resistive element connected serially, said cell positioned relative to the television receiver in a manner so as to be struck by light of the same intensity which strikes the viewing face of said picture tube, means connecting a voltage across said voltage divider, and means connecting a point on said voltage divider to said bias means whereby the contrast level of said receiver increases with an increase in the intensity of the light striking said viewing face and decreases with a decrease in the intensity of the light striking said viewing face.

2. An automatic contrast and brightness control circuit for a television receiver having a picture tube including an electrode for controlling the brightness level of said picture tube and a viewing face which is struck by light from a source external to said picture tube comprising: a keyed automatic gain control circuit having an electron discharge device including a cathode and control electrode, means for establishing a bias voltage between said cathode and control electrode, a voltage divider including a photo-conductive cell and at least one resistive element connected serially, said cell positioned relative to the television receiver in a manner so as to be struck by light of the same intensity which strikes the viewing face of said picture tube, means connecting a voltage across said voltage divider, means connecting a point on said voltage divider to said bias means, and means connecting said voltage divider to said electrode in said picture tube whereby the contrast level and brightness level of said receiver increase with an increase in the intensity of the light striking said viewing face and decrease with a decrease in the intensity of the light striking said viewing face.

3. An automatic contrast control circuit for a television receiver having a picture tube including a viewing face which is struck by light from a source external to said picture tube comprising: a keyed automatic gain control circuit having an electron discharge device including a cathode and control electrode, means biasing said control electrode, a first resistive voltage divider having two terminals, a second voltage divider including a photo-conductive cell and at least one resistive element connected serially, said cell positioned relative to the television receiver in a manner so as to be struck by light of the same intensity which strikes the viewing face of said picture tube, means connecting one terminal of said first voltage divider to a bias potential, means connecting the other terminal of said first voltage divider to a point on said second voltage divider, means connecting the cathode of said electron discharge device to a point on said first voltage divider, and means connecting a voltage across said second voltage divider.

4. An automatic contrast and brightness control circuit for a television receiver having a picture tube including a first anode and a viewing face which is struck by light from a source external to said picture tube comprising: a keyed automatic gain control circuit having an electron discharge device including a cathode and control electrode, means biasing said control electrode, a first resistive voltage divider having two terminals, a second voltage divider including a photo-conductive cell and at least one resistive element connected serially, said cell positioned relative to the television receiver in a manner so as to be struck by light of the same intensity which strikes the viewing face of said picture tube, means connecting one terminal of said first voltage divider to a bias potential, means connecting the other terminal of said first voltage divider to a point on said second voltage divider, means connecting the cathode of said electron discharge device to a point on said first voltage divider, means connecting a voltage across said second voltage divider, and means connecting said first anode of said picture tube to a point on said second voltage divider.

5. A television receiver comprising:

(A) means for receiving a transmitted signal having video signal modulation components, for converting said received signal to an intermediate frequency, and for amplifying said intermediate frequency signal;

(B) video signal detection means having a load circuit and providing at said load circuit a detected video signal having a contrast level;

(C) means coupling said intermediate frequency signal from said receiving, converting and intermediate frequency amplifying means to said video signal detection means;

(D) automatic gain control means providing an automatic gain control voltage for controlling the gain of said receiver;

(E) means coupling said automatic gain control voltage to said receiving, converting and intermediate frequency amplifying means for controlling the gain thereof;

(F) said automatic gain control means providing an automatic gain control characteristic for said receiver comprising a plurality of different contrast level regulation curves representing received signal intensity versus video signal amplitude existing at said video detector load circuit;

(G) said automatic gain control means including means for establishing the contrast level at said video detector load circuit at a desired one of said contrast level regulation curves;

(H) a picture tube having a signal input electrode and a viewing face which is struck by light from a source external to said picture tube;

(I) automatic contrast control means coupled to said automatic gain control means for causing the contrast level at said detector load circuit to automatically increase and to decrease to regulation curves of different contrast level on said characteristic respective to its initially established level when the intensity of light striking said viewing face respectively increases and decreases, said automatic contrast control means including an element positioned relative to said television receiver for being struck by light of the same intensity which strikes the face of said picture tube, said element having an electrical characteristic which is proportional to the intensity of light striking the element, and (J) means for amplifying and coupling said contrast level, and said changes in contrast level caused by said automatic contrast control means, from said detector load circuit to said picture tube input electrode.

6. A television receiver comprising:

(A) means for receiving a transmitted signal having video signal modulation components, for converting said received signal to an intermediate frequency, and for amplifying said intermediate frequency signal;

(B) video signal detection means having a load circuit and providing at said load circuit a detected video signal having a contrast level;

(C) means coupling said intermediate frequency signal from said receiving, converting and intermediate frequency amplifying means to said video signal detection means;

(D) automatic gain control means providing an automatic gain control voltage for controlling the gain of said receiver;

(E) means coupling said automatic gain control voltage to said receiving, converting and intermediate frequency amplifying means for controlling the gain thereof;

(F) said automatic gain control means providing an automatic gain control characteristic for said receiver comprising a plurality of different contrast level regulation curves representing received signal intensity versus video signal amplitude existing at said video detector load circuit;

(G) said automatic gain control means including means for establishing the contrast level at said video detector load circuit at a desired one of said contrast level regulation curves;

(H) a picture tube having a signal input electrode, a receiver brightness control electrode and a viewing face which is struck by light from a source external to said picture tube;

(I) automatic brightness and contrast control means coupled to said brightness control electrode and to said automatic gain control means, for causing a brightness level of an image reproduced on said viewing face to increase and decrease and the contrast level at said detector load circuit to automatically increase and to decrease to regulation curves of different contrast level on said characteristic respective to its initially established level when the intensity of light striking said viewing face respectively increases and decreases, said brightness and contrast control means including an element positioned relative to said television receiver for being struck by light of the same intensity which strikes the face of said picture tube and having an electrical characteristic which is proportional to the intensity of light striking the element, and (J) means for amplifying and coupling said contrast level, and said changes in contrast level caused by said contrast control means, from said detector load circuit to said picture tube input electrode.

7. A television receiver comprising:

(A) means for receiving a transmitted signal having video signal modulation components, for converting said received signal to an intermediate frequency, and for amplifying said intermediate frequency signal;

(B) video signal detection means having a load circuit and providing at said load circuit a detected video signal having a contrast level;

(C) means coupling said intermediate frequency signal from said receiving, converting and intermediate frequency amplifying means to said video signal detection means;

(D) an automatic gain control circuit providing an automatic gain control voltage for controlling the gain of said receiver;

(E) means coupling said automatic gain control voltage to said receiving, converting and intermediate frequency amplifying means for controlling the gain thereof;

(F) said automatic gain control circuit providing an automatic gain control characteristic for said receiver comprising a plurality of different contrast level regulation curves representing received signal intensity versus video signal amplitude existing at said video detector load circuit;

(G) said automatic gain control circuit including means for establishing the contrast level at said video detector load circuit at a desired one of said contrast level regulation curves;

(H) a picture tube having a signal input electrode and a viewing face which is struck by light from a source external to said picture tube;

(I) automatic contrast control circuit means providing an automatically variable direct current operating voltage for said automatic gain control circuit for causing the contrast level at said detector load circuit to change from said initial contrast level regulation curve to regulation curves of increased and decreased contrast level on said characteristic when the intensity of light striking said picture tube viewing face respectively increases and decreases;

(J) said automatic contrast control circuit means including a control element positioned relative to said television receiver for being struck by light of the same intensity which strikes the face of said picture tube and having an electrical characteristic which is proportional to the intensity of light striking the element and means for coupling said direct current voltage to said automatic gain control circuit, and (K) means for amplifying and coupling said video signal of initially established contrast level, and said changes in contrast level regulation curve caused by said contrast control means, from said detector load circuit to said picture tube input electrode.

8. The structure recited in claim 7 wherein said control element comprises a photo-conductive cell and said circuit means for providing said variable voltage comprises a voltage divider including said element.

9. The device of claim 8 wherein said automatic gain control circuit includes an amplifying device.

10. A television receiver comprising:

(A) means for receiving a transmitted signal having video signal modulation components, for converting said received signal to an intermediate frequency, and for amplifying said intermediate frequency signal;

(B) video signal detection means having a load circuit and providing at said load circuit a detected video signal having a contrast level;

(C) means coupling said intermediate frequency signal from said receiving, converting and intermediate frequency amplifying means to said video signal detection means;

(D) an automatic gain control circuit providing an automatic gain control voltage for controlling the gain of said receiver;

(E) means coupling said automatic gain control voltage to said receiving, converting and intermediate frequency amplifying means for controlling the gain thereof;

(F) said automatic gain control circuit providing an automatic gain control characteristic for said receiver comprising a plurality of different contrast level regulation curves representing received signal intensity versus video signal amplitude existing at said video detector load circuit;

(G) said automatic gain control circuit including means for establishing the contrast level at said video detector load circuit at a desired one of said contrast level regulation curves;

(H) a picture tube having a signal input electrode, an electrode for controlling the receiver brightness level, and a viewing face which is struck by light from a source external to said picture tube;

(I) automatic brightness and contrast control circuit means providing automatically variable direct current operating voltages for said picture tube brightness control electrode and for said automatic contrast control circuit for causing a brightness level of an image reproduced on said viewing face to increase and decrease and the contrast level at said detector load circuit to change from said initial contrast level regulation curve to regulation curves of increased and decreased contrast level on said characteristic when the intensity of light striking said picture tube viewing face respectively increases and decreases;

(J) said automatic brightness and contrast control circuit means including a control element positioned relative to said television receiver for being struck by light of the same intensity which strikes the face of said picture tube and having an electrical characteristic which is proportional to the intensity of light striking the element and means for coupling said direct current voltages to said brightness control electrode and said automatic gain control circuit, and (K) means for amplifying and coupling said video signal of initially established contrast level, and said changes in contrast level regulation curve caused by said latter contrast and brightness control means, from said detector load circuit to said picture tube input electrode.

11. The structure recited in claim 10 wherein said control element comprises a photo-conductive cell and said circuit means for providing said variable voltage comprises a voltage divider including said element.

12. The device of claim 11 wherein said automatic gain control circuit includes an amplifying device.

13. In a television receiver having means for receiving a transmitted television signal, video detection circuit means including a load circuit and providing a detected composite video output signal, said composite video output signal including synchronizing components, a signal source providing a signal which is coincident in time with said synchronizing components, and a picture tube including a viewing face which is struck by light from a source external to said picture tube, an automatic contrast control circuit comprising: a keyed automatic gain control circuit including an electron discharge device for providing an automatic gain control characteristic for said receiver; said characteristic comprising a plurality of different contrast level regulation curves respresenting received signal intensity versus video signal amplitude existing at said video detector load circuit; said automatic gain control circuit including means for establishing the contrast level at said video detector load circuit at a desired one of said contrast level regulation curves; means coupling said composite video signal and said coincidence signal to said automatic gain control electron discharge device in a manner for providing an automatic gain control voltage for said receiver; a voltage divider including a photo-conductive cell, said cell positioned relative to the television receiver in a manner so as to be struck by light of the same intensity which strikes the viewing face of said picture tube and having an electrical conductivity which varies in relation to the intensity of light striking the element; and means direct-current coupling said voltage divider to said electron discharge device for causing a contrast level regulation curve of increased and decreased contrast level to exist at said load circuit when the intensity of light striking said viewing face respectively increases and decreases.

14. In a television receiver having means for receiving a transmitted television signal, video detection circuit means including a load circuit and providing a detected composite video output signal, said composite video output signal including synchronizing components, a signal source providing a signal which is coincident in time with said synchronizing components, and a picture tube including an electrode for controlling the brightness level of an image reproduced on a viewing face of said picture tube, said viewing face struck by light from a source external to said picture tube, an automatic contrast and brightness control circuit comprising: a keyed automatic gain control circuit including an electron discharge device for providing an automatic gain control characteristic for said receiver; said characteristic comprising a plurality of different contrast level regulation curves representing received signal intensity versus video signal amplitude existing at said video detector load circuit; said automatic gain control circuit including means for establishing the contrast level at said video detector load circuit at a desired contrast level regulation curve; means coupling said composite video signal and said coincidence signal to said electron discharge device in a manner for providing an automatic gain control voltage for said receiver; a voltage divider including a photo-conductive cell, said cell positioned relative to the television receiver in a manner so as to be struck by light of the same intensity which strikes the viewing face of said picture tube and having an electrical conductivity which varies in relation to the intensity of light striking the element, means connecting said voltage divider to said electron discharge device and means connecting said voltage divider to said brightness control electrode for causing a contrast level regulation curve of increased and decreased contrast level to exist at said load circuit and an increase and decrease in the receiver brightness level when the intensity of light striking said viewing face respectively increases and decreases.

15. A television receiver comprising:

(A) means for receiving a transmitted signal having video signal modulation components, for converting said received signal to an intermediate frequency, and for amplifying said intermediate frequency signal;

(B) video signal detection means having a load circuit for providing at said load circuit a detected video signal having a contrast level;

(C) means coupling said intermediate frequency signal from said receiving, converting and intermediate frequency amplifying means to said video signal detection means;

(D) automatic gain control means providing an automatic gain control voltage for controlling the gain of said receiver;

(E) means coupling said automatic gain control voltage to said receiving, converting and intermediate frequency amplifying means for controlling the gain thereof;

(F) said automatic gain control means providing an automatic gain control characteristic for said receiver comprising a plurality of different contrast level regulation curves representing received signal intensity versus video signal amplitude existing at said video detector load circuit;

(G) said automatic gain control means including means for establishing the contrast level at said video detector load circuit at a desired one of said contrast level regulation curves;

(H) a picture tube having a signal input electrode and a viewing face which is struck by light from a source external to said picture tube;

(I) means coupling said video amplifier output electrode to said picture tube input electrode;

(J) automatic contrast control means coupled to said automatic gain control means, for causing the contrast level at said detector load circuit to automatically increase and to decrease to regulation curves of different control level on said characteristic respective to its initially established level when the intensity of light striking said viewing face respectively increases and decreases, said automatic contrast control means including an element positioned relative to said television receiver for being struck by light of the same intensity which strikes the face of said picture tube and having an electrical characteristic which is proportional to the intensity of light striking the element.

16. A television receiver comprising:

(A) means for receiving a transmitted signal having video signal modulation components, for converting said received signal to an intermediate frequency, and for amplifying said intermediate frequency signal;

(B) video signal detection means having a load circuit and providing at said load circuit a detected video signal having a contrast level;

(C) means coupling said intermediate frequency signal from said receiving, converting and intermediate frequency amplifying means to said video signal detection means;

(D) automatic gain control means providing an automatic gain control voltage for controlling the gain of said receiver;

(E) means coupling said automatic gain control voltage to said receiving converting and intermediate frequency amplifying means for controlling the gain thereof;

(F) said automatic gain control means providing an automatic gain control characteristic for said receiver comprising a plurality of different contrast level regulation curves representing received signal intensity versus video signal amplitude existing at said video detector load circuit;

(G) said automatic gain control means including means for establishing the contrast level at said video detector load circuit at a desired one of said contrast level regulation curves;

(H) a picture tube having a signal input electrode and a viewing face which is struck by light from a source external to said picture tube;

(I) automatic contrast control means coupled to said automatic gain control means for causing the contrast level at said detector load circuit to automatically increase and to decrease to regulation curves of different contrast level on said characteristic respective to its initially established level when the intensity of light striking said viewing face respectively increases and decreases, and (J) means for amplifying and coupling said contrast level, and said changes in contrast level caused by said automatic contrast control means, from said detector load circuit to said picture tube input electrode.

17. In a television receiver having means for receiving a transmitted television signal, video detection circuit means including a load circuit and providing a detected composite video output signal, said composite video output signal including synchronizing components, a signal source providing a signal which is coincident in time with said synchronizing components, and a picture tube including a viewing face which is struck by light from a source external to said picture tube, an automatic contrast control circuit comprising: a keyed automatic gain control circuit including an electron discharge device having first, second and third electrodes for providing an automatic gain control characteristic for said receiver; said characteristic comprising a plurality of different contrast level regulation curves representing received signal intensity versus video signal amplitude existing at said video detector load circuit; said automatic gain control circuit including means for establishing the contrast level at said video detector load circuit at a desired one of said contrast level regulation curves; means coupling said composite video signal and said coincidence signal to said first and second electrodes respectively of said automatic gain control electron discharge device in a manner for providing an automatic gain control voltage for said receiver; a voltage divider including a photo-conductive cell, said cell positioned relative to the television receiver in a manner so as to be struck by light of the same intensity which strikes the viewing face of said picture tube and having an electrical conductivity which varies in relation to the intensity of light striking the element; and means direct-current coupling said voltage divider to said third electrode of said electron discharge device for causing a contrast level regulation curve of increased and decreased contrast level to exist at said load circuit when the intensity of light striking said viewing face respectively increases and decreases.

18. The apparatus of claim 17 wherein said electron discharge device comprises an electron discharge amplifying device and said first, second, and third electrodes comprise control, anode, and cathode electrodes respectively thereof.

19. In a television receiver having means for receiving a transmitted television signal, video detection circuit means including a load circuit and providing a detected composite video output signal, said composite video output signal including synchronizing components, a signal source providing a signal which is coincident in time with said synchronizing components, and a picture tube including an electrode for controlling the brightness level of an image reproduced on a viewing face of said picture tube, said viewing face struck by light from a source external to said picture tube, an automatic contrast and brightness control circuit comprising: a keyed automatic gain control circuit including an electron discharge device having first, second, and third electrodes for providing an automatic gain control characteristic for said receiver; said characteristic comprising a plurality of different contrast level regulation curves representing received signal intensity versus video signal amplitude existing at said video detector load circuit; said automatic gain control circuit including means for establishing the contrast level at said video detector load circuit at a desired contrast level regulation curve; means coupling said composite video signal and said coincidence signal to said first and second electrodes respectively of said electron discharge device in a manner for providing an automatic gain control voltage for said receiver; a voltage divider including a photo-conductive cell, said cell positioned relative to the television receiver in a manner so as to be struck by light of the same intensity which strikes the viewing face of said picture tube and having an electrical conductivity which varies in relation to the intensity of light striking the element, means connecting said third electrode of said voltage divider to said electron discharge device and means connecting said voltage divider to said brightness control electrode for causing a contrast level regulation curve of increased and decreased contrast level to exist at said load circuit and an increase and decrease in the receiver brightness level when the intensity of light striking said viewing face respectively increases and decreases.

20. The apparatus of claim 19 wherein said electron discharge device comprises an electron discharge amplifying device and said first, second, and third electrodes comprise control, anode, and cathode electrodes respectively thereof.

References Cited in the file of this patent

UNITED STATES PATENTS

| | | |
|---|---|---|
| 2,264,172 | Batchelor | Nov. 25, 1941 |
| 3,027,421 | Heijligers | Mar. 27, 1962 |

FOREIGN PATENTS

| | | |
|---|---|---|
| 440,895 | Italy | Oct. 20, 1948 |
| 1,223,058 | France | June 15, 1960 |
| 1,227,937 | France | Aug. 24, 1960 |
| 1,233,068 | France | May 2, 1960 |